United States Patent
Waddell et al.

(10) Patent No.: US 12,548,003 B2
(45) Date of Patent: Feb. 10, 2026

(54) APPARATUS AND METHOD FOR FACILITATING NFC TRANSACTIONS WITHIN PAYMENT SLOT

(71) Applicant: Shopify Inc., Ottawa (CA)

(72) Inventors: David Waddell, Nelson (CA); Michael Joseph DeFazio, Fonthill (CA)

(73) Assignee: Shopify Inc., Ottawa (CA)

( * ) Notice: Subject to any disclaimer, the term of this patent is extended or adjusted under 35 U.S.C. 154(b) by 394 days.

(21) Appl. No.: 17/993,553

(22) Filed: Nov. 23, 2022

(65) Prior Publication Data
US 2024/0169333 A1 May 23, 2024

(51) Int. Cl.
G06Q 20/20 (2012.01)
G06Q 20/34 (2012.01)

(52) U.S. Cl.
CPC ......... *G06Q 20/204* (2013.01); *G06Q 20/341* (2013.01); *G06Q 20/352* (2013.01)

(58) Field of Classification Search
CPC ... G06Q 20/204; G06Q 20/341; G06Q 20/352
USPC .......................................................... 705/17
See application file for complete search history.

(56) References Cited

U.S. PATENT DOCUMENTS

| | | | |
|---|---|---|---|
| 9,936,337 B2 * | 4/2018 | Lamba | H04B 1/401 |
| 2017/0278094 A1 * | 9/2017 | Mackie | G06Q 20/3224 |
| 2017/0344976 A1 * | 11/2017 | Lee | H04W 52/34 |
| 2021/0185802 A1 * | 6/2021 | Slaney | G06Q 20/3278 |
| 2021/0271834 A1 | 9/2021 | Takakura et al. | |
| 2023/0140038 A1 * | 5/2023 | Tsai | G06Q 20/3278 705/41 |

FOREIGN PATENT DOCUMENTS

| | | | | |
|---|---|---|---|---|
| FR | 2985346 A1 * | 7/2013 | | G06K 19/07769 |
| WO | WO-2018091846 A1 * | 5/2018 | | G06Q 20/045 |

OTHER PUBLICATIONS

Patent Cooperation Treaty (PCT) International Search Report for International Application No. PCT/CA2023/050851, 4 pages, date of mailing: Aug. 18, 2023.
Patent Cooperation Treaty (PCT) Written Opinion of the International Searching Authority for International Application No. PCT/CA2023/050851, 8 pages, date of mailing: Aug. 18, 2023.

* cited by examiner

*Primary Examiner* — Luna Champagne
(74) *Attorney, Agent, or Firm* — Moffat & Co

(57) ABSTRACT

A payment terminal comprising: a slot configured for receiving of a payment card therein; and a near field communications (NFC) circuit comprising at least one antenna, wherein a first antenna of the at least one antenna is located proximate the slot and configured to communicate with an NFC circuit on the payment card when the payment card is disposed in the slot.

22 Claims, 7 Drawing Sheets

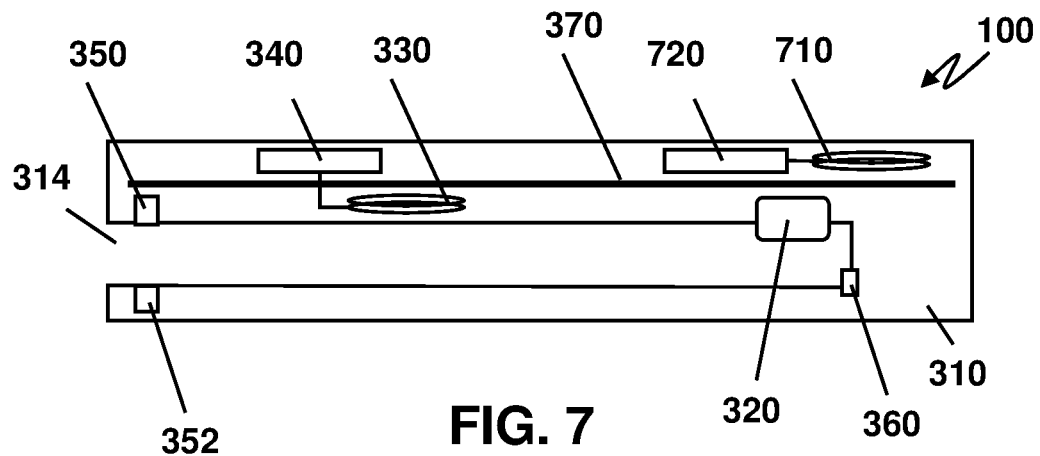
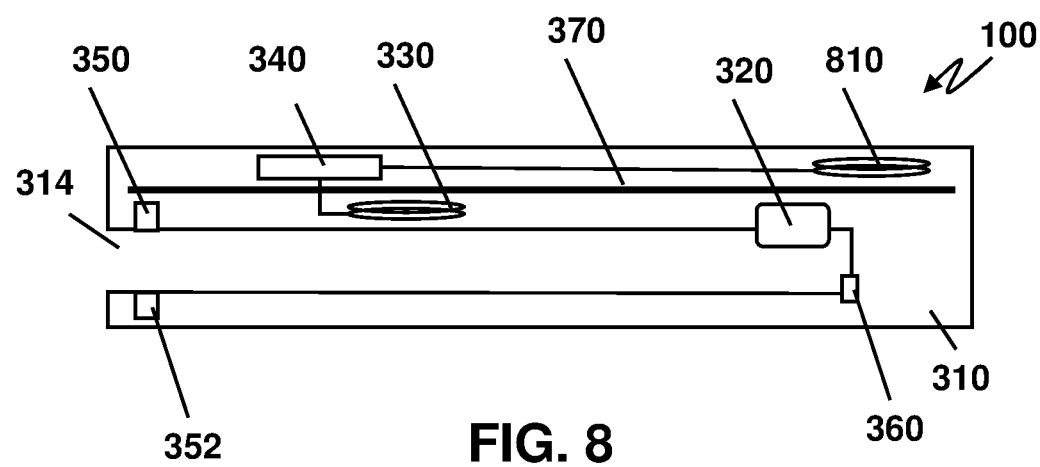

APPARATUS AND METHOD FOR FACILITATING NFC TRANSACTIONS WITHIN PAYMENT SLOT

FIELD OF THE DISCLOSURE

The present disclosure is related to near-field contactless transactions utilizing short range communication technology.

BACKGROUND

Many Point of Sale (POS) terminals now include the ability to receive a contactless or "tap" transaction, which is enabled through near field communications (NFC) technology. During such a transaction, the customer can bring a payment mechanism, such as a credit card, debit card, mobile device, wearable such as a watch or the watch band, jewelry, among other options, into proximity with the NFC reader on the POS terminal. In passive NFC mode, this will energize the antenna and chip within the payment mechanism and allow the payment terminal to receive information about the payment mechanism, as well as a response to a challenge.

Payment cards such as credit cards or debit cards may further include an integrated circuit, making such card an integrated circuit card (ICC) or chip card. Typically, such card will include an embedded microchip that is activated when the card is inserted into a card slot on a payment device or terminal, known as "dipping". When the card is fully inserted, as for example identified by a switch at the end of the card slot, an electrical contact may be made with the circuit in the card and information may be read from the card. This, combined with security measures such as entry of a Personal Identification Number (PIN), is used to facilitate the transaction.

Payment cards such as credit cards or debit cards may in some cases include a magnetic stripe which may be read by swiping the card through a slot containing a magnetic stripe reader. Information contained on the magnetic stripe may be used to facilitate the transaction.

SUMMARY

A payment terminal may have a first location on the terminal to perform the tap transaction using the NFC reader and a second location on the terminal for the card slot to perform the ICC transaction. Typically, the card slot is shielded from radio frequency waves.

In some cases, a payment terminal may have a slot used to swipe a card to read information from a magnetic stripe on the card. Such slot is typically located away from and may be shielded from the NFC reader.

The tapping of an NFC enabled payment card at a payment terminal may be faster than the insertion of the card into an ICC slot (i.e. a dip reader slot) and the entering of a PIN. Further, the tapping of an NFC enabled payment card at a payment terminal may be faster than the swiping of the payment card through a magnetic card reader and the general requirement for a customer to sign for the transaction. The use of NFC tapping may lead to faster service for customers that are waiting to checkout at a store, a higher throughput of customers for the store, among other benefits.

However, in some jurisdictions, the use of a contactless payment is not a heavily adopted payment method, and customers may not be aware that a tap transaction is possible.

In other cases, a customer may not be aware of a tap transaction limit, and may therefore opt to use the dip reader for the ICC and PIN method of payment. For example, if a customer is unsure whether a tap transaction will work, they may choose to insert the card and enter the PIN to avoid any embarrassment if the tap transaction fails.

Therefore, in accordance with the embodiments of the present disclosure, a dip reader slot is modified to allow for an NFC transaction to occur as a customer is inserting a payment card into a dip reader and/or swiping a card across a magnetic card reader.

In one aspect, a payment terminal may be provided. The payment terminal may comprise a slot configured for receiving of a payment card therein. The payment terminal may further comprise a near field communications (NFC) circuit having at least one antenna, wherein a first antenna of the at least one antenna is located proximate the slot and configured to communicate with an NFC circuit on the payment card when the payment card is disposed in the slot.

In some embodiments, the payment terminal may further comprise a sensor to detect disposing of the payment card into the slot.

In some embodiments, the sensor may be proximate an opening of the slot and may be at least one of a mechanical and an optical switch.

In some embodiments the sensor may be a switch within the slot.

In some embodiments, the NFC circuit may comprise the first antenna proximate the slot and a second antenna from the at least one antenna, the second antenna associated with a second location of the payment terminal, and wherein detecting disposing of the payment card into the slot may cause the NFC circuit to use the first antenna.

In some embodiments, the at least one antenna may comprise a single antenna, and wherein radio shielding at the payment terminal for shielding radio communications may be configured to allow the antenna to read from both a surface of the payment terminal and from within the slot.

In some embodiments, the payment terminal may further comprise pads to energize an integrated circuit of the payment card and a processor configured to execute instruction code to delay the energizing of the integrated circuit while an NFC transaction is being attempted.

In some embodiments, the payment terminal may further comprise a user interface configured to provide an indication of a successful NFC transaction.

In some embodiments, the payment card may be disposed in the slot by inserting the payment card into the slot.

In a further aspect a method may be provided, where, upon disposing of a payment card in a slot on a payment terminal, the method may use an antenna proximate the slot to attempt a Near Field Communications (NFC) transaction.

In some embodiments, the method may further comprise detecting disposing of the payment card in the slot at the payment terminal.

In some embodiments, the method may further comprise, prior to using the antenna, determining that a transaction value is below a threshold value.

In some embodiments, the method may further comprise, prior to using the antenna, determining that a previous NFC transaction using the same payment card was not rejected by a payment processor.

In some embodiments, the payment terminal may have two NFC antennas, and the method may further comprise, upon detecting disposing of the payment card in the slot, switching an NFC circuit to use the antenna proximate the slot.

In some embodiments, the method may further comprise delaying initializing a microchip on the payment card during the attempt of the NFC transaction.

In some embodiments, the method may further comprise providing feedback with a user interface on the payment terminal to indicate that the NFC transaction was successful.

In some embodiments, the method may further comprise prompting entering of a personal identification number when the NFC transaction is unsuccessful.

In some embodiments, the detecting may use a sensor on the payment terminal.

In some embodiments, the sensor is at least one of a mechanical and an optical sensor proximate an opening of the slot.

In still a further aspect, a non-transitory computer readable medium for storing instruction code may be provided. The instruction code, when executed by a processor of a payment terminal, may cause the payment terminal to, upon disposing of a payment card in a slot on the payment terminal, use an antenna proximate the slot to attempt a Near Field Communications (NFC) transaction.

BRIEF DESCRIPTION OF THE DRAWINGS

The present disclosure will be better understood with reference to the drawings, in which:

FIG. 7 is a cross sectional view of one embodiment of a dip reader that may be used with the embodiments of the present disclosure.

FIG. 8 is a cross sectional view of one embodiment of a dip reader that may be used with the embodiments of the present disclosure.

DETAILED DESCRIPTION

The present disclosure will now be described in detail by describing various illustrative, non-limiting embodiments thereof with reference to the accompanying drawings and exhibits. The disclosure may, however, be embodied in many different forms and should not be construed as being limited to the illustrative embodiments set forth herein. Rather, the embodiments are provided so that this disclosure will be thorough and will fully convey the concept of the disclosure to those skilled in the art.

In accordance with the embodiments of the present disclosure, a dip reader slot is modified to allow for an NFC transaction to occur as a customer is inserting a payment card into the slot. While the embodiments of the present disclosure are described below with regards to NFC, other short-range communication technologies such as radio frequency identification (RFID), Bluetooth™, Infrared Data Association (IrDA) communications, among others, may potentially be used with embodiments described herein. The embodiments below describing NFC are therefore provided for illustration purposes only. The skilled reader would further recognize that the modifications described below in relation to dip reader slots could be applied more broadly to card readers in which payment cards are disposed, including, for example, the dip reader slot (e.g. into a payment card is inserted), and a magnetic stripe card reader slot (e.g. through which a payment card is swiped).

Figure 1A:
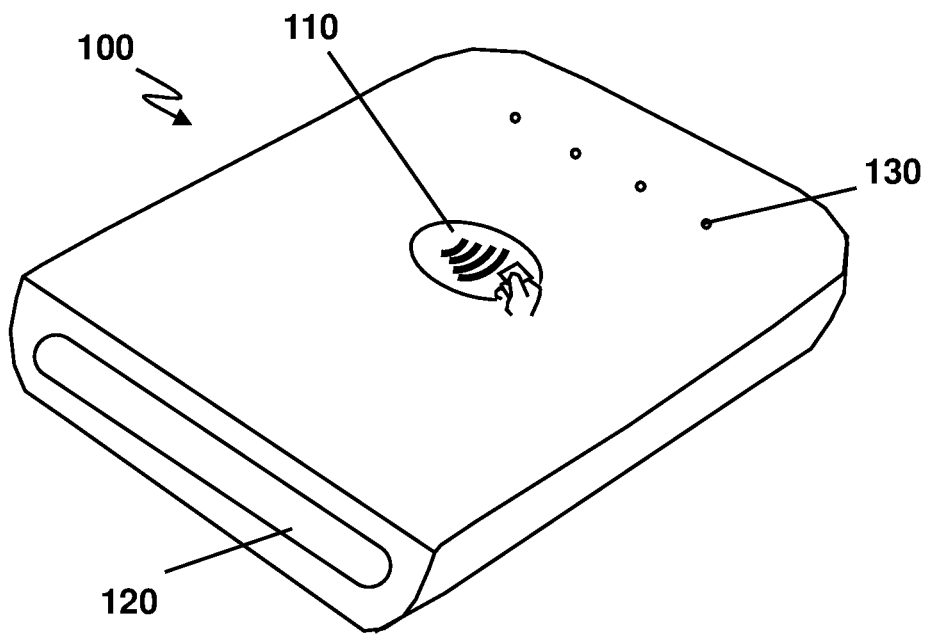
FIG. 1A is a top perspective view of an example payment terminal that may be used with the embodiments of the present disclosure.

For example, reference is now made to FIG. 1A. The embodiment of FIG. 1A shows an example payment terminal 100 which may be used in a payment transaction. Payment terminal 100 is however only provided for illustration purposes, and the configuration of payment terminal 100 can vary depending on the functionality required for the payment terminal, the merchant, the computing system to which the payment terminal is connected, among other factors.

In the example of FIG. 1A, payment terminal 100 includes an NFC reader 110 which may be used for a contactless or tap transaction. As used herein, the terms "contactless payment", "tap payment" and "tap transaction" are interchangeable, and can include any contactless payment technology, including, but not limited to, Visa Paywave™, Mastercard PayPass™, American ExpressPay™, among other options.

In accordance with the NFC standards, an initiator is the computing device initiating a transaction. It may also be referred to as an NFC reader. The initiator is the device which may start a transaction by energizing an NFC antenna and may use a single device discovery (SDD) protocol to locate and communicate with a target.

A target, as used herein, is any device which may provide a response to an initiator. For example, the target in a contactless transaction may be a passive target such as a credit card, debit card, or jewelry, where the NFC antenna on the passive target requires the field generated by the initiator to power a chip on the card to provide data to the initiator. In other cases, the target may be an active target which may be capable of generating its own RF field. Examples may include mobile devices, wearables such as smart watches, fobs, among others.

Further, payment terminal 100 may include a dip reader slot 120. In particular, card dipping is the insertion of a payment card into a slot of the payment terminal, where the integrated circuit on the card can be read. With dipping, the card is inserted into the reader chip-side first. An electrical contact may be established with the embedded microchip on the card in order to obtain information from the card, and to provide a challenge and receive a response from the card.

Payment terminal 100 may further include a user interface 130 to provide feedback to a user of the payment terminal. In the example of FIG. 1A, the user interface 130 consists of a series of lights that may be illuminated to indicate that information has been read from the payment mechanism, for example.

However, in other cases, various types of user interfaces may be provided. For example, the user interface 130 may include a screen to provide feedback to a user. In some cases, the user interface 130 may include auditory feedback mechanisms. In some cases, user interface 130 may include haptic feedback mechanisms.

The user interface 130 may further provide an input mechanism to allow interaction with the payment terminal 100. For example, user interface 130 may include a keyboard or a keypad to enter a PIN or other information. In some cases, user interface 130 may include a touch screen which allows input from a user. Other input mechanisms are possible.

Typically, payment terminal 100 is connected to a point of sale terminal (not shown), which may be any computing or mobile device. Such connection may be wired or wireless, and the point of sale terminal maybe located proximate to the payment terminal 100 or remotely from the payment terminal 100.

In some cases, the user interface on the point of sale terminal may be used for a transaction. For example, with the illustrated embodiment of FIG. 1A, payment terminal 100 does not include an input mechanism. However, the point of sale terminal may have a touch screen, keyboard or keypad that allows the user to enter a PIN when required. Other options are possible.

However, in other embodiments, payment terminal 100 may be a stand alone terminal and not be connected to any other point of sale terminal.

Figure 1B:
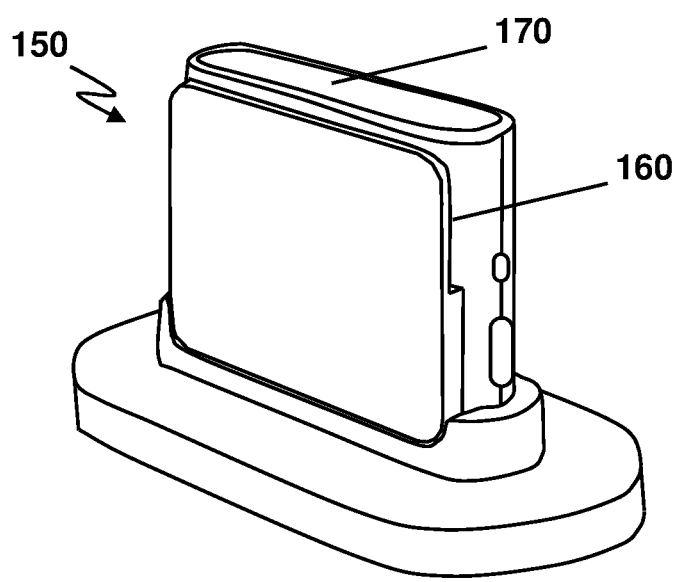
FIG. 1B is a top perspective view of a further example payment terminal that may be used with the embodiments of the present disclosure.

In another example, a payment terminal 150 may be used. Reference is now made to FIG. 1B. In the embodiment of FIG. 1B, the payment terminal 150 may have a slot 160 that can be used to swipe a payment card and read information from a magnetic stripe on the payment card. In this regard, payment terminal 150 may include a magnetic reader head within slot 160.

The example of FIG. 1B further includes a card slot 170 which may be similar to dip reader slot 120 from FIG. 1A. However, the inclusion of a card slot 170 is optional, and in some cases payment terminal 150 may only include a slot 160 for reading a magnetic stripe on a card.

Payment terminal 150 may communicate, either through wired or wireless communications, with a device such as a tablet, smartphone or other similar computing device in some cases. As such, a user interface may be provided on such computing device.

In some cases, the payment terminal may be a stand alone terminal with a slot for a magnetic swipe reader.

Figure 2A:
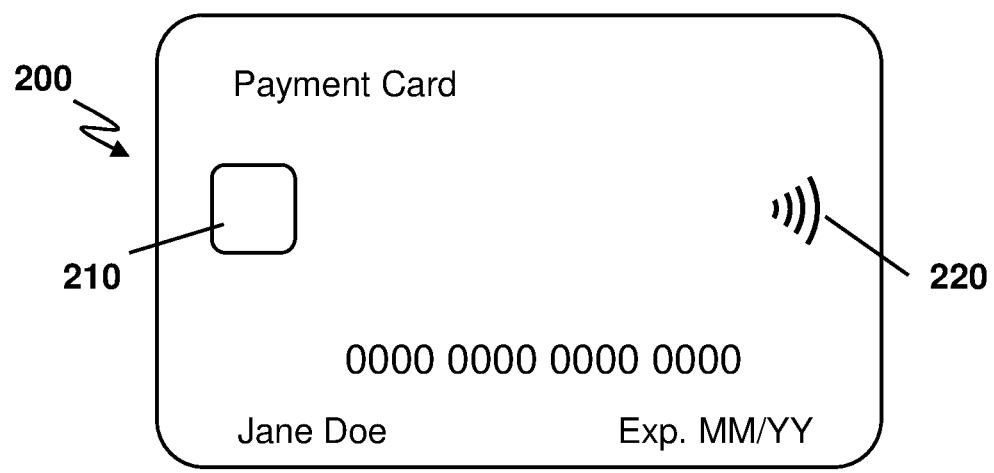
FIG. 2A is an elevational view of a front of a payment card.
Figure 2B:
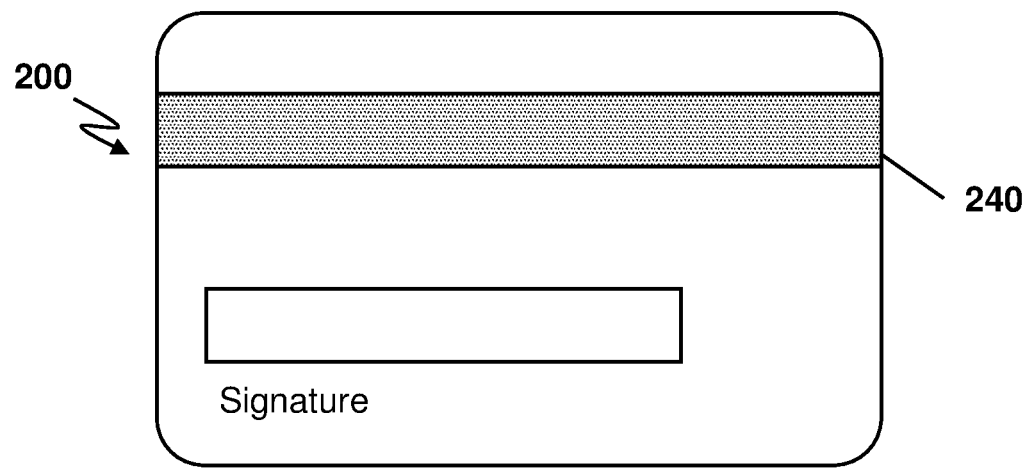
FIG. 2B is an elevational view of a back of a payment card.

In accordance with the embodiments of the present disclosure, the payment mechanism may be a payment card such as a credit card. Reference is now made to FIGS. 2A and 2B.

The example FIG. 2A shows a payment card 200 having an integrated circuit or microchip 210 and an NFC circuit 220.

In some cases, payment card 200 may be a standard EMV (Europay, MasterCard, Visa) card, and may be referred to as a smart card, chip card, integrated circuit (IC) card, an electronically encoded card, or contactless card, among other options. Payment card 200 may comply with the International Standards Organization (ISO)/International Electrotechnical Commission (IEC) 7816 standard in some cases.

In operation, when a customer is trying to pay at a payment terminal 100, they may bring their payment card 200 into proximity with the NFC reader 110. This will then energize the NFC circuit 220 on the payment card 200. Payment card 200 includes a secure storage as part of the NFC circuit, and this may be used to generate a response to a challenge from the NFC reader 110. Such response and information from the payment card 200 may then be checked and information may then be sent to a payment processor such as a bank, payment clearinghouse, among other options.

Alternatively, the customer may insert the payment card 200 into the dip reader slot 120 of payment terminal 100. In this case, contacts may electrically engage the integrated circuit or microchip 210 and the payment card 200 may provide information, and a response to a challenge back to the payment terminal 100. Additional verification such as a PIN may be input at the point of sale terminal or the payment terminal. The information, once verified, may be provided to a payment processor by the payment terminal, for example through the point of sale terminal.

However, as described above, tapping of an NFC enabled payment card at a payment terminal is typically faster than the insertion of the card into an ICC slot and the entering of a PIN. This can lead to faster service for customers that are waiting to checkout at a store, a higher throughput of customers for the store, among other benefits.

In other cases, instead of, or in addition to, microchip 210, the payment card 200 may include a magnetic stripe 240, as for example shown in the embodiment of FIG. 2B.

Therefore, in accordance with the embodiments of the present disclosure, a slot in a dip reader or magnetic stripe reader is modified to allow for an NFC transaction to occur as a customer is disposing a payment card in the slot, either by inserting the payment card into a dip reader or swiping a card through the slot in a magnetic stripe reader.

In particular, in one embodiment an NFC antenna can be located proximate the slot such that it can energize the NFC chip on the card and receive information from the card as the card is being inserted into the slot. This can occur by placing the NFC antenna in radio contact with the dip reader. For example, this may be accomplished by placing the NFC antenna within the shielding of the slot, or by modifying the shielding of the slot and placing the NFC antenna at a location that allows interaction with a card in the slot, among other options.

Figure 3:
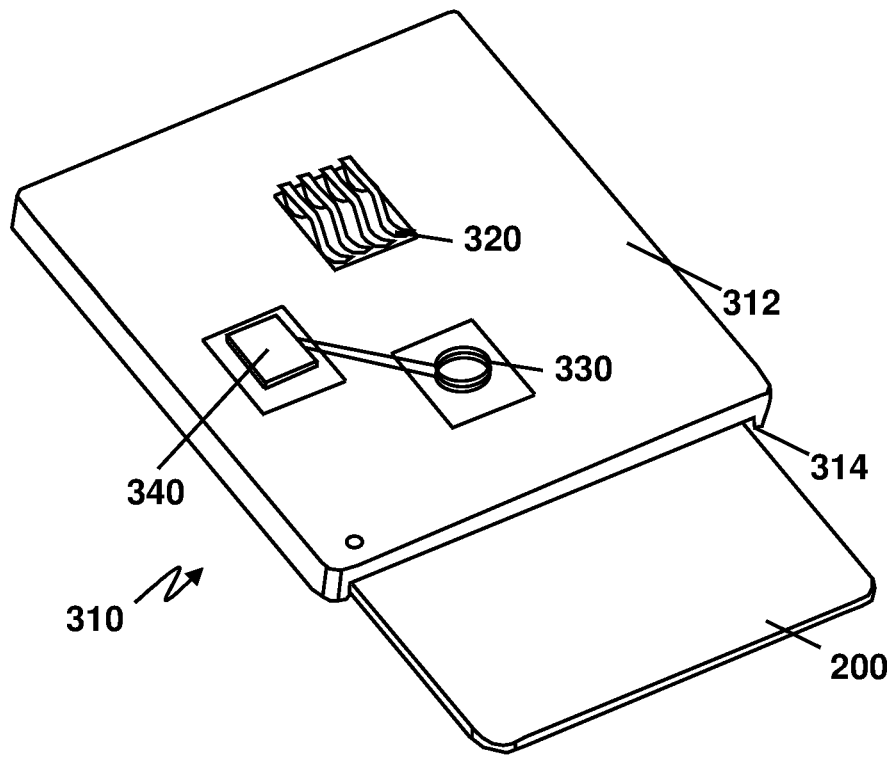
FIG. 3 is a top perspective view of an example dip reader that may be used with the embodiments of the present disclosure.

Reference is now made to FIG. 3, which shows a dip reader 310 which may be a part of payment terminal 100. Dip reader 310 comprises a casing 312 having a slot 314 therein. In practice, a payment card 200 can be inserted into slot 314.

When payment card 200 is fully inserted, contacts 320 may be used to complete an electrical connection between the dip reader 310 and the microchip 210 on payment card 200. In the example of FIG. 3, contacts 320 are spring contacts used to make contact with the microchip 210. However, other options, such as actuated contacts, among other options, are possible.

Typically contacts 320 are connected to a processor, memory and a communications subsystem (not shown) to allow the payment transaction to be completed.

In accordance with the embodiments of the present disclosure, an NFC antenna 330 may be positioned to allow radio contact with a payment card 200 while the payment card is within the slot 314 of dip reader 310. This may include radio contact while the payment card 200 is being inserted, and/or radio contact when the card is fully inserted into slot 314.

NFC antenna 330 is shown in the embodiment of FIG. 3 as positioned on the same side of the dip reader 310 as the contacts 320. However, in practice, the NFC antenna 330 may be positioned anywhere where radio contact with payment card 200 is possible. Therefore, NFC antenna 330 could be positioned below slot 314 in some embodiments. In other cases, NFC antenna 330 could be positioned to one side of dip reader 310. In some cases, NFC antenna 330 could be positioned closer to the slot opening side of dip reader 310. In other cases, the NFC antenna 330 could be positioned further back from the slot opening of dip reader 310. Other options for the placement of NFC antenna are possible.

NFC antenna 330 is typically connected to and controlled by an NFC chipset 340, which may be located anywhere within payment terminal 100.

Figure 4:
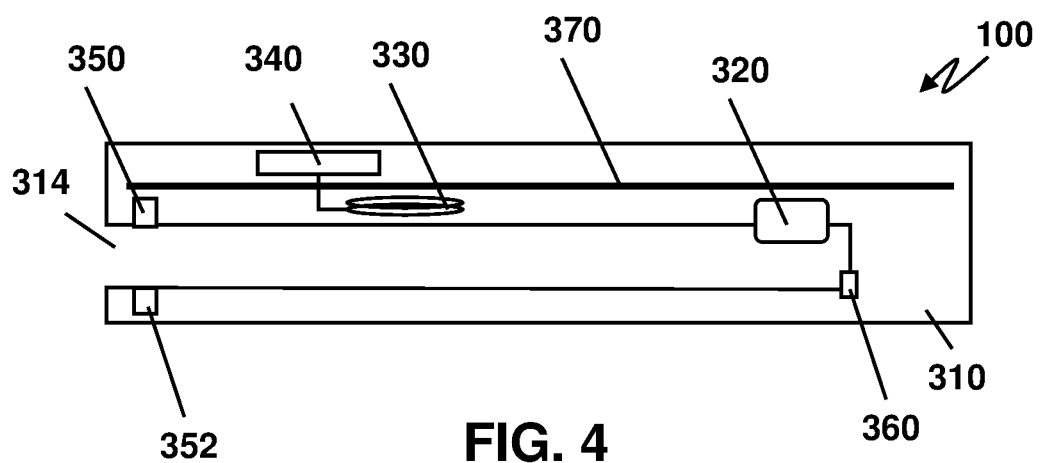
FIG. 4 is a cross sectional view of one embodiment of a dip reader that may be used with the embodiments of the present disclosure.

Reference is now made to FIG. 4, which shows a cross sectional view of the payment terminal 100 of FIG. 1A. In some embodiments, various switches and or sensors may form part of the dip reader 310 within payment terminal 100. In particular, a first sensor 350 may comprise an optical switch with an optical reader 352. In this case, the sensor is located near the opening of slot 314 and can detect the insertion of a payment card 200 into the slot 314. However, the use of a light switch is merely provided for illustration. In various embodiments, any switch may be used near the opening of slot 314. For example, the switch may be a microswitch such as a pin plunger, spring pin, spring short, leaf spring, leaf lever, rotating operation, among others. In some embodiments the sensor may be a sensor located outside the slot 314, such as a camera, motion sensor, among others. The present disclosure is not limited to the use of a particular sensor. Further, the use of a sensor 350 is optional, and in some cases no sensor is provided for dip reader 310.

Further, the sensor 350 does not necessarily need to be at the opening of slot 314, and may be positioned further back from the opening of slot 314 in some cases.

In some cases, a sensor 360 may be used to detect when payment card 200 is fully inserted. Sensor 360 can be any sensor capable of detecting the insertion of payment card 200, and can include an optical or mechanical switch in some embodiments.

In some embodiments, dip reader 310 may include no sensors. In some cases, dip reader 310 may include only one of sensor 350 or sensor 360. In some cases, dip reader 310 may include both sensor 350 and sensor 360. In some cases, other sensors may further be provided at dip reader 310.

Further, in the embodiment of FIG. 4, a radio shield 370 is shown. Radio shield 370 is capable of isolating slot 314 from unwanted radio waves.

As seen in the embodiment of FIG. 4, the NFC antenna 330 is positioned on the slot side of radio shield 370. However, this is optional and in some cases the radio shield 370 may be modified to allow radio interaction between the antenna 330 and the payment card 200, even if the NFC antenna 330 is positioned on the opposite side of the radio shield 370. In some cases, radio shield 370 may be omitted.

Further, in some cases, it may be desirable to have a single antenna 330 be capable of performing transactions both for a tap transaction on the outside of payment terminal 100 and the transaction within the slot 314. For example, an operator or owner of a payment terminal 100 may wish to allow for contactless transactions by payment devices other than a payment card 200 and therefore still want the ability to perform a tap transaction or contactless transaction on the outside of payment terminal 100. This would allow the use of a mobile device, fob, or other NFC payment mechanism that would not be capable of being inserted into slot 314 to be used.

Further, even if using a payment card 200, in some cases the operator or owner of the payment terminal 100 may wish to have the capability of the user performing a contactless transaction on the outside of payment terminal 100.

In this regard, the shield 370 may be adapted to allow for radio communications to proceed both above and below antenna 330.

Figure 5:
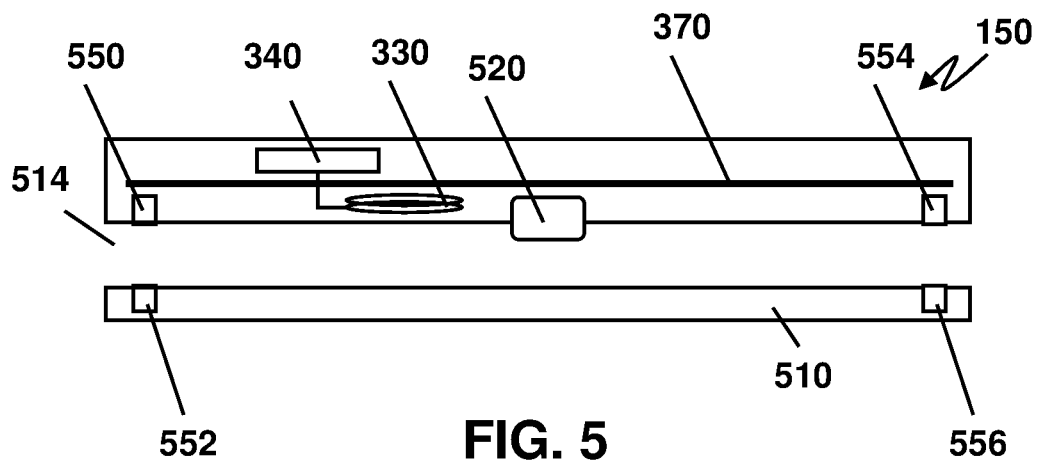
FIG. 5 is a cross sectional view of one embodiment of a magnetic card slot on a payment terminal that may be used with the embodiments of the present disclosure

Reference is now made to FIG. 5, which shows a cross sectional view of a magnetic stripe reader 510 of the payment terminal 150 of FIG. 1B. In the payment terminal, a slot 514 is used to guide a payment card 200, and in particular the magnetic stripe 240 of the payment card 200, past the magnetic reader head 520, in order for information from the magnetic stripe 240 to be read by the magnetic reader head 520.

In some embodiments, various switches and or sensors may form part of the magnetic stripe reader 510 within payment terminal 150. In particular, a first sensor 550 may comprise an optical switch with an optical reader 552. In this case, the sensor is located near one side of slot 514 and can detect the swiping of a payment card 200 with the slot 514.

In some cases, a second sensor 554 may comprise an optical switch with an optical reader 556 and be used to detect swiping from the opposite side of slot 514.

However, the use of a light switch is merely provided for illustration. In various embodiments, any switch may be used within slot 514. For example, the switch may be a microswitch such as a pin plunger, spring pin, spring short, leaf spring, leaf lever, rotating operation, among others. In some embodiments the sensor may be a sensor located outside the slot 514, such as a camera, motion sensor, among others. The present disclosure is not limited to the use of a particular sensor. Further, the use of a sensor 550 and/or sensor 554 is optional, and in some cases no sensor is provided for magnetic stripe reader 510.

Further, the sensor 550 and/or sensor 554 does not necessarily need to be at an end of slot 514, and may be positioned further back from an opening of slot 514 in some cases.

In some embodiments, magnetic stripe reader 510 may include no sensors. In some cases, magnetic stripe reader 510 may include only one of sensor 550 or sensor 554. In some cases, magnetic stripe reader 510 may include both sensor 550 and sensor 554. In some cases, other sensors may further be provided at magnetic stripe reader 310.

Further, in the embodiment of FIG. 5, a radio shield 370 is shown. Radio shield 370 is capable of isolating slot 514 from unwanted radio waves. However, in other cases no radio shield is provided with magnetic stripe reader 510.

As seen in the embodiment of FIG. 5, the NFC antenna 330 is positioned on the slot side of radio shield 570. However, this is optional and in some cases the radio shield 570 may be modified to allow radio interaction between the antenna 330 and the payment card 200, even if the NFC antenna 330 is positioned on the opposite side of the radio shield 570. In some cases, radio shield 570 may be omitted.

Further, in some cases, it may be desirable to have a single antenna 330 be capable of performing transactions both for a tap transaction on the outside of payment terminal 150 and the transaction within the slot 514. For example, an operator or owner of a payment terminal 150 may wish to allow for contactless transactions by payment devices other than a payment card 200 and therefore still want the ability to perform a tap transaction or contactless transaction on the outside of payment terminal 150. This would allow the use of a mobile device, fob, or other NFC payment mechanism that would not be capable of being inserted into slot 514 to be used.

Further, even if using a payment card 200, in some cases the operator or owner of the payment terminal 150 may wish to have the capability of the user performing a contactless transaction on the outside of payment terminal 150.

In this regard, the shield 370 may be adapted to allow for radio communications to proceed both above and below antenna 330.

NFC antenna 330 is typically connected to and controlled by an NFC chipset 340, which may be located anywhere within payment terminal 150.

Figure 6:
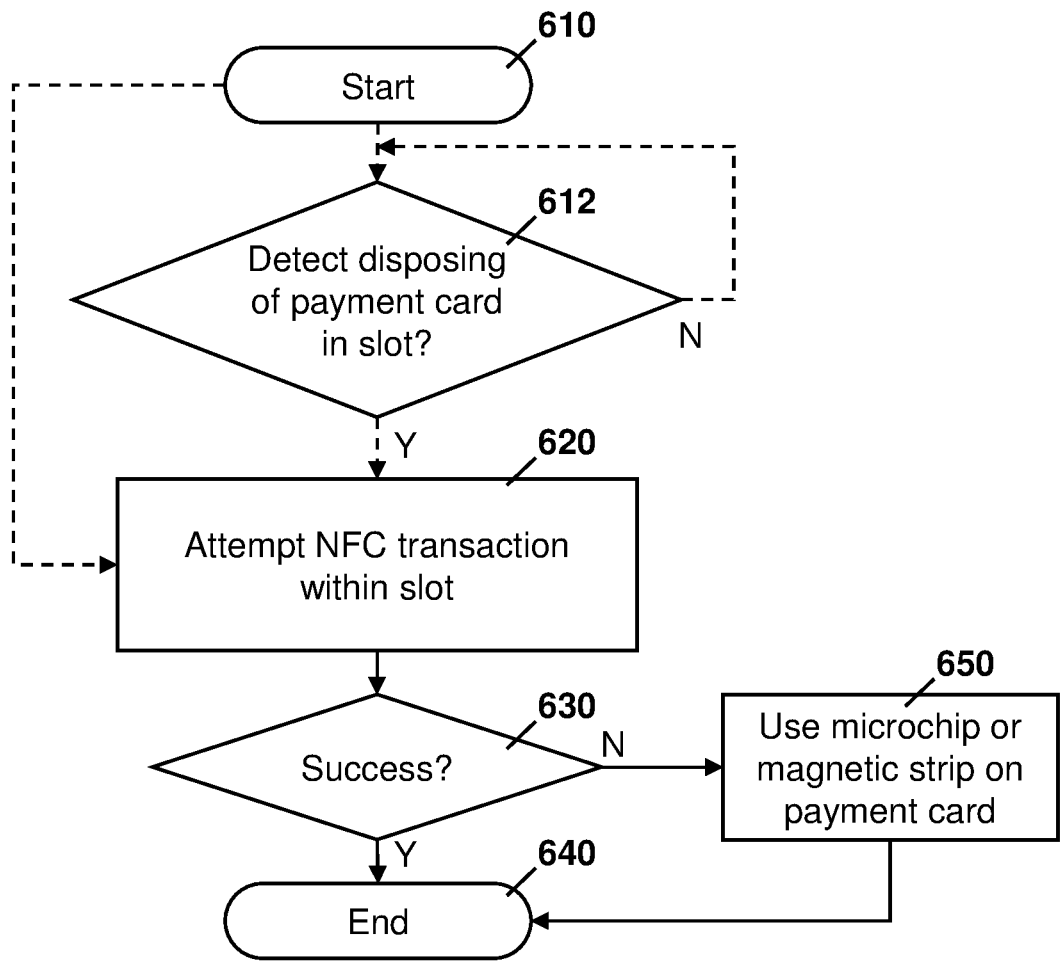
FIG. 6 is a process diagram of a process for performing an NFC transaction while a payment card is in a payment slot.

Reference is now made to FIG. 6, which shows the operation of a payment terminal having a dip reader or magnetic stripe reader, such as those described above with regard to FIGS. 3, 4 and 5.

The process of FIG. 6 starts at block 610 and may optionally proceed to block 612 in which the payment terminal may detect the insertion or disposing of a payment card in the slot. The detection of the disposing of the payment card in the slot may, for example, utilize sensor 350, 360, 550 or 554 to indicate when a payment card 200 is inserted. Thus, for example, if an optical or mechanical switch situated near the opening of slot 314 is triggered, or if an optical or mechanical switch situated near the opening of slot 514 is triggered, this may indicate that a card is currently being inserted or has been inserted into the slot 314 or 514. Similarly, if sensor 360 indicates that a payment card 200 has been fully inserted, this may also provide the indication to the payment terminal.

From block 612, if no card insertion or disposing detection is found, the process may proceed back to block 612 and wait until a card is disposed into the slot.

Conversely, if a card is detected to be disposed into the slot at block 612, the process may proceed to block 620.

Further, as indicated above, block 612 is optional, and the process may start by proceeding directly to block 620. In this case, the antenna 330 may be energized and trying to make contact with any card that is disposed in slot 314 or 514. In some cases, the antenna 330 may be energized when a point of sale terminal indicates to the payment terminal data transaction is pending. Other options are possible.

At block 620, the payment terminal attempts to perform an NFC transaction within the dip reader slot utilizing an antenna 330. This may occur as the card is being inserted or disposed in the slot, or once the card has been fully inserted. In this case, the NFC chipset utilizing antenna 330 may act as an integrator and attempt to perform a challenge and response from the target, which consists of the payment card 200.

From block 620, the process proceeds to block 630 in which a check is made to determine whether the NFC transaction was successful. If yes, the process proceeds to block 640 and ends.

From block 630, if the NFC transaction is not successful, then the process proceeds to block 650 in which the payment terminal 100 attempts to use the microchip reader or magnetic stripe reader to perform the transaction. For example, this may occur by utilizing contacts 320 on the microchip 210 of payment card 200 for an integrated circuit card. A user may be prompted to enter a PIN at this point. It may instead involve using magnetic stripe 240 to obtain information about the card using a magnetic stripe reader.

In some cases, the NFC mechanism and the integrated circuit on the payment card may be exclusive of each other, and only one may be used at a time. In this case, a delay may be introduced prior to the use of the microchip at block 650. Such delay would ensure that the microchip is not used until after the check of whether the NFC transaction was successful at block 630 is complete. Thus, even if the card is fully inserted, as detected by a sensor 360, the integrated circuit card transaction may be delayed until the NFC transaction attempt is complete. Similarly, a delay may be introduced in processing a transaction when information is read by the magnetic stripe reader until the check on whether the NFC transaction was successful at block 630 is complete.

From block 650 the process proceeds to block 640 and ends.

While the embodiments of FIGS. 3, 4 and 5 have a single NFC antenna, in some cases, a payment terminal may be equipped with two NFC circuits, one for an external tap location, and one for the slot in the dip reader or magnetic stripe reader. Reference is now made to FIG. 7, which shows a payment terminal 100 similar to that described above with regard to FIG. 4. However, in the embodiment of FIG. 7 a second NFC antenna 710 is provided above radio shield 370. Further, in the embodiment of FIG. 7, a second NFC chipset 720 is used with NFC antenna 710.

In some cases, rather than two NFC chipsets, a payment terminal may instead be equipped with a single NFC circuit or chipset, but with two NFC antennas. Reference is now made to FIG. 8 which shows a payment terminal 100 similar to that described above with regard to FIG. 4. However, in the embodiment of FIG. 8, a first antenna 810 may be located near an external surface of the payment terminal and be used for traditional tap or contactless transactions. A second NFC antenna 330 may be placed in or near the slot in the dip reader to interact with cards within the slot. In this case, antenna 810 and antenna 330 are both controlled using NFC chipset 340.

Therefore, based on the embodiments of FIGS. 7 and 8, two or more antennas controlled by one or more NFC chipsets may be provided at a payment terminal.

Similarly, the embodiment of FIG. 5 may be modified as with the embodiments of FIGS. 7 and 8 to include two or more antennas.

When using two NFC antennas, various logic circuits may in some cases be used to switch between the antennas. For example, a switch (e.g. mechanical, optical, etc.) or some other sensor 350, 550 or 554 near the opening of the slot of the dip reader or magnetic stripe reader, or a sensor 360 near the end of the slot, may provide a signal that a card is being inserted or disposed in the slot. In some cases, this may provide an indication to control logic at the NFC chipset and, based on the indication, the NFC chipset may switch to using the antenna associated with the slot.

In some cases, both antennas may be connected simultaneously, and the NFC circuit could read signals from the antenna 330 from FIG. 7 or 8 upon receipt of the indication. Thus, the disposing of the card in the slot may allow an indication to the system to attempt to interface with the payment card using the NFC antenna in the slot.

In other cases, the payment terminal may try energizing one antenna and then the other antenna periodically until a response is sensed. Other options are possible.

Figure 9:
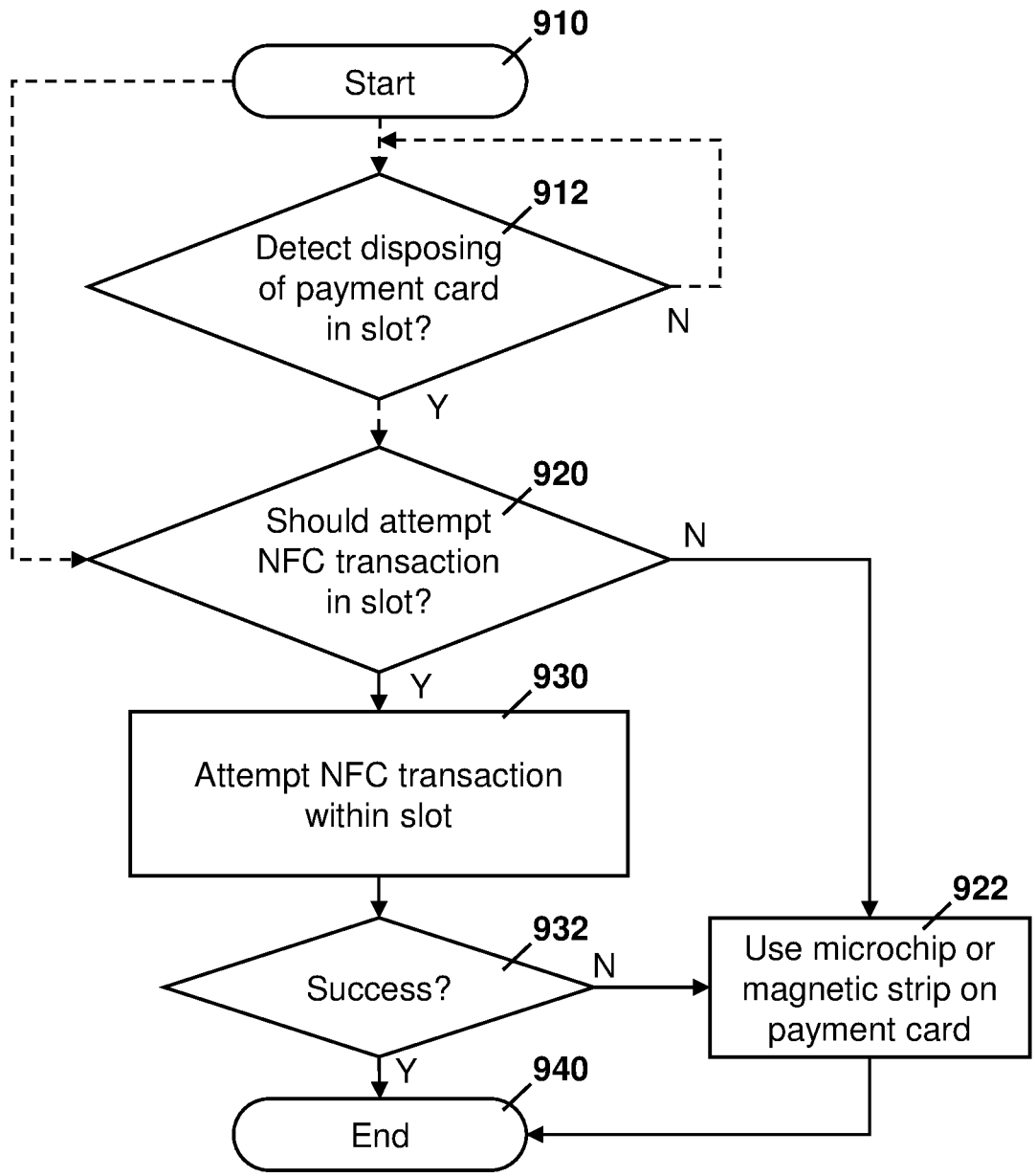
FIG. 9 is a process diagram of a process for performing an NFC transaction while a payment card is in a payment slot.

The use of the NFC reader within the slot of the dip reader or magnetic stripe reader can occur in various ways. Reference is now made to FIG. 9.

The process of FIG. 9 starts at block 910 and optionally proceeds to block 912 in which a payment terminal may detect the disposing of a payment card in a slot. If, at block 912, the disposing of a payment card in the slot is not detected, the process may continue to loop until the disposing of the payment card in the slot is detected. Once the disposing of the payment card in the slot is detected, the process may proceed from block 912 to block 920. Further, the check at block 912 is optional and in some cases the process may proceed directly from block 910 to block 920.

At block 920, a check is made to determine whether an NFC transaction should be attempted using the antenna 330 within the slot of the dip or magnetic stripe reader.

For example, in some cases, an NFC transaction can be attempted within the slot if the value of the transaction being performed is less than a merchant or issuer tap limit. Specifically, a merchant may have set a limit for contactless transactions to allow only those transactions that are below a threshold value. If the value of the transaction is greater than this threshold, the merchant may require the chip and PIN payment, or the magnetic stripe payment and signature, to be used instead.

Further, an issuer for payment card 200 may have set a limit on the transaction value.

In some cases, a manufacturer of the payment terminal 100 may use a pre-set, defined, or hardcoded limit.

Thus, in some cases, the merchant, issuer, or a defined tap transaction limit may be provided to payment terminal 100 or 150.

The check at block 920 may therefore determine whether the value of the payment transaction being attempted is less than the defined, merchant and/or issuer transaction limits. Specifically, if only one limit is received at the payment terminal 100 or 150, then the check at block 920 finds whether the value of the transaction is less than that limit. If multiple limits are received, the check at block 920 determines whether the value of the transaction is less than the lowest of the limits received.

If the value of the transaction is greater than any limit received, the process proceeds from block 920 to block 922 in which the microchip is used for a chip and PIN transaction or the magnetic stripe is used for the transaction.

Conversely, if the transaction value is less than the lowest limit received, the process proceeds from block 920 to block 930 in which an NFC transaction is attempted.

Instead of, or in addition to, the checking of transaction limits, the check at block 920 may consider results of previous transactions. For example, in some cases, a first tap transaction may have failed, and the customer may thereafter try a chip and PIN payment by inserting the payment card 200 into the slot. In this case, the error for the tap transaction may indicate that the NFC payment should not occur within the card slot, and that a chip and PIN payment should be used instead.

For example, if the customer's bank has set a tap limit (unknown to the payment terminal in this case), a contactless transaction may fail if the value of the transaction is over this limit. In this case, an error may be received from a payment processor such as the bank or a transaction clearinghouse, and this error may indicate that a further NFC transaction within the card slot should not be attempted.

However, in some cases a contactless transaction may fail because the card was moving too quickly. In this case the transaction may not have been sent to the payment processor, and rather be an error at the payment terminal itself. In this case, the insertion or disposing of the card in the slot may provide a steadier card on which to try an NFC transaction again.

Thus, an error for a previous tap transaction may be used to determine whether to attempt another NFC transaction.

Specifically, an error such as "Transaction Cancelled— Operator Timeout" may indicate that a card was not presented within a threshold time period. This may be due to the NFC tap transaction attempt moving too quickly and not allowing the reader to register the attempt, for example. In other cases, an issuer may indicate that the transaction failed, but should be tried again, for example using decline code "19—re enter". These types of errors may allow for a retry attempt, as determined at block 920.

However, a decline code from a card issuer such as "05—do not honor", "12—invalid transaction", or "62— invalid service code" may indicate that the NFC attempt using the top NFC antenna failed and that an NFC attempt using antenna 330 is unlikely to succeed. In this case, the check at block 920 may find that another NFC attempt should not be made, and the process may proceed to block 922 to attempt a chip and PIN payment or magnetic stripe payment.

Referring again to FIG. 9, from block 930, once the NFC transaction attempt is made, the process may precede to block 932 in which a check is made to determine whether the transaction was successful. As with the embodiment of FIG. 6, the attempt at block 930 and the check at block 932 may delay the utilization of the microchip or magnetic stripe information on the payment card.

From block 932, if the NFC attempt using antenna 330 was successful, the process proceeds to block 940 and ends.

Conversely, if the transaction using the NFC chip at block 930 was not successful, the process proceeds from block 932 to block 922 in which the microchip on the payment card is attempted to be used in a transaction in some cases, or in which information from the magnetic stripe 240 is attempted to be used in a transaction in some cases.

From block 922, the process proceeds to block 940 and ends.

In the above embodiments, if the NFC transaction works within the dip slot or the magnetic stripe reader slot, an audio, visual and/or haptic signal may be provided to the customer to indicate that the transaction was successful. This may reduce customer confusion when they have not yet entered their PIN.

The user interface may further be used to prompt the user for a PIN and proceed with a traditional ICC payment if the NFC transaction fails in some cases.

Figure 10:
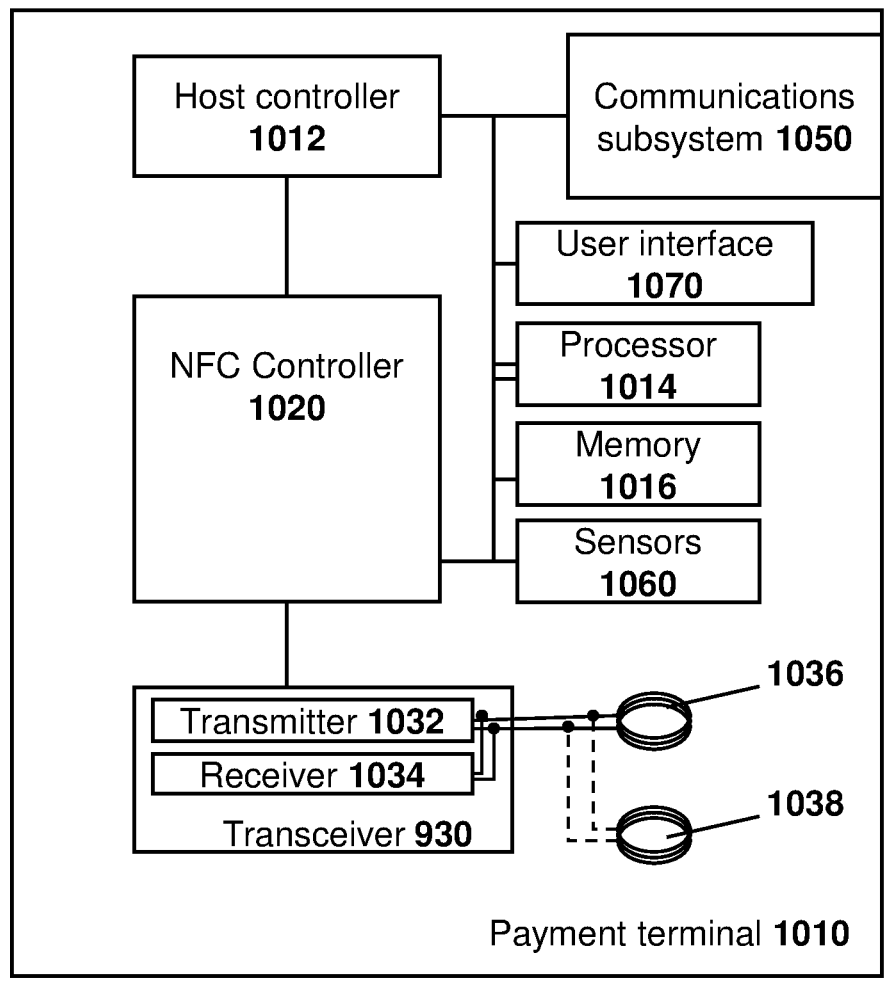
FIG. 10 is a block diagram of an example payment terminal capable of being used with the embodiments of the present disclosure.

Payment terminal 100 or 150 may be any computing device and use any NFC chipset to perform the NFC transaction. One example of a payment terminal is shown with regard to FIG. 10. Thus, FIG. 10 is a block diagram of a payment terminal 1010 in accordance with some embodiments.

Payment terminal 1010 may be payment terminal 100 from the embodiments of FIG. 1A, 4, 7 and 8, or payment terminal 150 from the embodiments of FIGS. 1B and 5, and includes a processor 1014. Processor 1014 is a hardware processor configured to execute programmable logic, which may be stored, along with data, on payment terminal 1010 and shown in the example of FIG. 10 as memory 1016. Memory 1016 can be any tangible, non-transitory computer readable storage medium such as optical (e.g., CD, DVD, etc.), magnetic (e.g., tape), flash drive, hard drive, or other memory known in the art.

Alternatively, or in addition to memory 1016, payment terminal 1010 may access data or programmable logic from an external storage medium, for example through communications subsystem 1050.

Payment terminal 1010 has an NFC controller 1020, which uses one or more processors (or processor cores) such as processor 1014 and memory 1016 in some cases, or use other dedicated processors and memory in other cases. The memory may include instructions that, when executed by the one or more processors, cause the NFC controller 1020 to implement an NFC protocol, for example as specified in standards such as ISO/IEC 18092, ECMA-340, and/or standards defined by the NFC Forum.

In some embodiments, these instructions are stored in a non-transitory computer-readable medium in the memory.

The NFC controller 1020 is coupled to and controls a transceiver 1030, which includes a transmitter 1032 and a receiver 1034. The transmitter 1032 and receiver 1034 are coupled to one or more NFC antennas, shown in the embodiment of FIG. 10 as antennas 1036 and 1038. During communication with another NFC device (e.g., payment card 200), the NFC controller 1020 may provide data to the transmitter 1032, which encodes the data and provides a corresponding signal to antenna 1036 and/or 1038.

The payment terminal 1010 may also include a host controller 1012 to execute one or more applications. Host controller may execute on a processor on the payment terminal and may store instruction code in a memory. The payment terminal 1010 may further include a secure element to store NFC data.

In addition, the payment terminal 1010 may include other components. For example, the payment terminal may include a communications subsystem 1050 to communicate with a computing device, point of sale terminal, payment process or network element. Communications subsystem 1050 allows payment terminal 1010 to communicate with other devices or network elements and the design of communications subsystem 1050 may be based on various types of communications being performed. Further, communications subsystem 1050 may comprise a plurality of communication technologies, including any wired or wireless communication technology.

Communication subsystem 1050 may further be used to interact with a microchip on a payment card 200 or with a magnetic stripe 240 on a payment card 200 using a magnetic stripe reader.

Further, other sensors may be associated with the payment terminal 1010. Such sensors may be internal sensors, shown as sensors 1060 in the embodiment of FIG. 10. However, in some cases, no other sensors may be present.

If present, the sensors 1060 may consist of various sensors, some of which can be used to determine if a payment card is inserted or disposed in a slot in the dip or magnetic stripe reader.

In some cases, sensor readings may be received from sensors associated with another computing device using communications subsystem 1050. For example, such sensor readings may be from cameras associated with a storefront, sensors associated with a point of sale terminal, among other options.

In the embodiment of FIG. 10, payment terminal 1010 may further include a user interface (UI) 1070. User interface 1070 may provide input options to a user of payment terminal 1010 in some cases. User interface 1070 may further provide auditory, visual or haptic feedback to provide a user with information. For example, user interface 1070 could include any of a display, lights, speakers, vibration mechanisms, among other options.

Based on the above, a payment terminal can use an antenna capable of radio communication within a slot of a dip reader or magnetic stripe reader to attempt an NFC contactless transaction as a payment card is inserted or disposed or once a payment card is inserted or disposed.

The elements described and depicted herein, including in flow charts and block diagrams throughout the figures, imply logical boundaries between the elements.

However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A payment terminal comprising:
    a slot configured for receiving of a payment card therein, the slot comprising a first payment interface; and
    a second payment interface within the slot comprising a near field communications (NFC) circuit having at least one antenna, wherein a first antenna of the at least one antenna is located proximate the slot and configured to communicate with an NFC circuit on the payment card while the payment card is disposed in the slot;
    wherein the payment terminal is configured to use the second payment interface prior to use of the first payment interface.

2. The payment terminal of claim 1, further comprising a sensor to detect disposing of the payment card into the slot.

3. The payment terminal of claim 2, wherein the sensor is proximate an opening of the slot and is at least one of a mechanical and an optical switch.

4. The payment terminal of claim 2, wherein the sensor is a switch within the slot.

5. The payment terminal of claim 2, wherein the NFC circuit comprises the first antenna proximate the slot and a second antenna from the at least one antenna, the second antenna associated with a second location of the payment terminal, and wherein detecting disposing of the payment card into the slot causes the NFC circuit to use the first antenna.

6. The payment terminal of claim 1, wherein the at least one antenna comprises a single antenna, and wherein radio shielding at the payment terminal for shielding radio communications is configured to allow the antenna to read from both a surface of the payment terminal and from within the slot.

7. The payment terminal of claim 1, further comprising:
    pads to energize an integrated circuit of the payment card; and
    a processor configured to execute instruction code to delay the energizing of the integrated circuit while an NFC transaction is being attempted.

8. The payment terminal of claim 1, further comprising a user interface configured to provide an indication of a successful NFC transaction.

9. The payment terminal of claim 1, wherein the payment card is disposed in the slot by inserting the payment card into the slot.

10. A method at a payment terminal comprising:
    detecting disposing of a payment card into a slot at the payment terminal, the slot comprising a first payment interface and a second payment interface, the second payment interface comprising a near field communications (NFC) circuit having at least one antenna, wherein a first antenna of the at least one antenna is located proximate the slot and configured to communicate with an NFC circuit on the payment card while the payment card is disposed in the slot; and
    upon detecting the disposing of a payment card in the slot, using the first antenna to attempt an NFC transaction prior to use of the first payment interface.

11. The method of claim 10, further comprising, prior to using the first antenna:
    determining that a transaction value is below a threshold value.

12. The method of claim 10, further comprising, prior to using the first antenna,
    determining that a previous NFC transaction using the same payment card was not rejected by a payment processor.

13. The method of claim 10, wherein the payment terminal has two NFC antennas, the method further comprising, upon detecting the disposing of the payment card in the slot, switching an NFC circuit to use the first antenna.

14. The method of claim 10, further comprising:
    delaying initializing a microchip on the payment card during the attempt of the NFC transaction.

15. The method of claim 14, further comprising providing feedback with a user interface on the payment terminal to indicate that the NFC transaction was successful.

16. The method of claim 14, further comprising prompting entering of a personal identification number when the NFC transaction is unsuccessful.

17. The method of claim 14, wherein the detecting uses a sensor on the payment terminal.

18. The method of claim 17, wherein the sensor is at least one of a mechanical and an optical sensor proximate an opening of the slot.

19. A non-transitory computer readable medium for storing instruction code, which, when executed by a processor of a payment terminal cause the payment terminal to:
    detect disposing of a payment card into a slot at the payment terminal, the slot comprising a first payment interface and a second payment interface, the second payment interface comprising a near field communications (NFC) circuit having at least one antenna, wherein a first antenna of the at least one antenna is located proximate the slot and configured to communicate with an NFC circuit on the payment card while the payment card is disposed in the slot; and
    upon detecting the disposing of a payment card in the slot, use the first antenna to attempt an NFC transaction prior to use of the first payment interface.

20. The non-transitory computer readable medium of claim 19, wherein the instruction code further causes the payment terminal to, prior to use of the first antenna,
    determine that a previous NFC transaction using the same payment card was not rejected by a payment processor.

21. The non-transitory computer readable medium of claim 19, wherein the payment terminal has two NFC antennas, the instruction code further causing the payment terminal to, upon detection of the disposing of the payment card in the slot, switch an NFC circuit to use the first antenna.

22. The non-transitory computer readable medium of claim 19, wherein the instruction code further causes the payment terminal to:

delay initializing a microchip on the payment card during the attempt of the NFC transaction.

\* \* \* \* \*